(12) United States Patent
Seder et al.

(10) Patent No.: US 11,772,086 B2
(45) Date of Patent: Oct. 3, 2023

(54) MULTIFUNCTIONAL SELF-CLEANING SURFACE LAYER AND METHODS OF FORMING THE SAME

(71) Applicant: GM GLOBAL TECHNOLOGY OPERATIONS LLC, Detroit, MI (US)

(72) Inventors: Thomas A Seder, Fraser, MI (US); James A. Carpenter, Rochester Hills, MI (US); Gayatri V. Dadheech, Bloomfield Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 1148 days.

(21) Appl. No.: 16/410,667

(22) Filed: May 13, 2019

(65) Prior Publication Data

US 2020/0360912 A1 Nov. 19, 2020

(51) Int. Cl.
*B01J 35/00* (2006.01)
*B01J 31/38* (2006.01)
(Continued)

(52) U.S. Cl.
CPC ........... *B01J 35/004* (2013.01); *B01J 21/063* (2013.01); *B01J 31/38* (2013.01); *B01J 37/344* (2013.01)

(58) Field of Classification Search
CPC ........ B01J 35/004; B01J 21/063; B01J 31/38; B01J 37/344; B01J 21/08; B01J 21/18; B01J 35/1057; C01B 33/133
(Continued)

(56) References Cited

U.S. PATENT DOCUMENTS 8,815,378 B2  8/2014 Gueneau et al.
9,861,974 B2  1/2018 Dadheech et al.
(Continued)

FOREIGN PATENT DOCUMENTS

CA     1135964 A   11/1982
CN     1950307 A    4/2007
(Continued)

OTHER PUBLICATIONS

Tao et al., Fabrication of robust, self-cleaning, broadband TiO2—SiO2 double-layer antireflective coatings with closed-pore structure through a surface sol-gel process, 2018, Journal of Alloys and Compounds, vol. 747, pp. 43-49 (Year: 2018).*
Harikishore et al., Effect of Ag doping on Antibacterial and Photocatalytic Activity of Nanocrystalline TiO2, 2014, Procedia Materials Science, vol. 6, pp. 557-566 (Year: 2014).*
(Continued)

*Primary Examiner* — Coris Fung
*Assistant Examiner* — Ritu S Shirali
(74) *Attorney, Agent, or Firm* — Harness, Dickey & Pierce, P.L.C.

(57) ABSTRACT

A multifunctional self-cleaning surface layer and methods of preparing the multifunctional self-cleaning surface layer are provided. The multifunctional self-cleaning surface layer includes an inorganic matrix including silicon and oxygen; a plurality of photocatalytic active particles distributed within and bonded to the inorganic matrix; and a plurality of nanopores defined within the inorganic matrix in regions corresponding to bonds between the plurality of photocatalytic active particles and the inorganic matrix. Water molecules may be disposed within at least a portion of the plurality of nanopores. In the presence of water and electromagnetic radiation, the plurality of photocatalytic active particles may facilitate a decomposition reaction of any oil or organic residue on the multifunctional self-cleaning surface layer.

17 Claims, 3 Drawing Sheets

Figure 2:
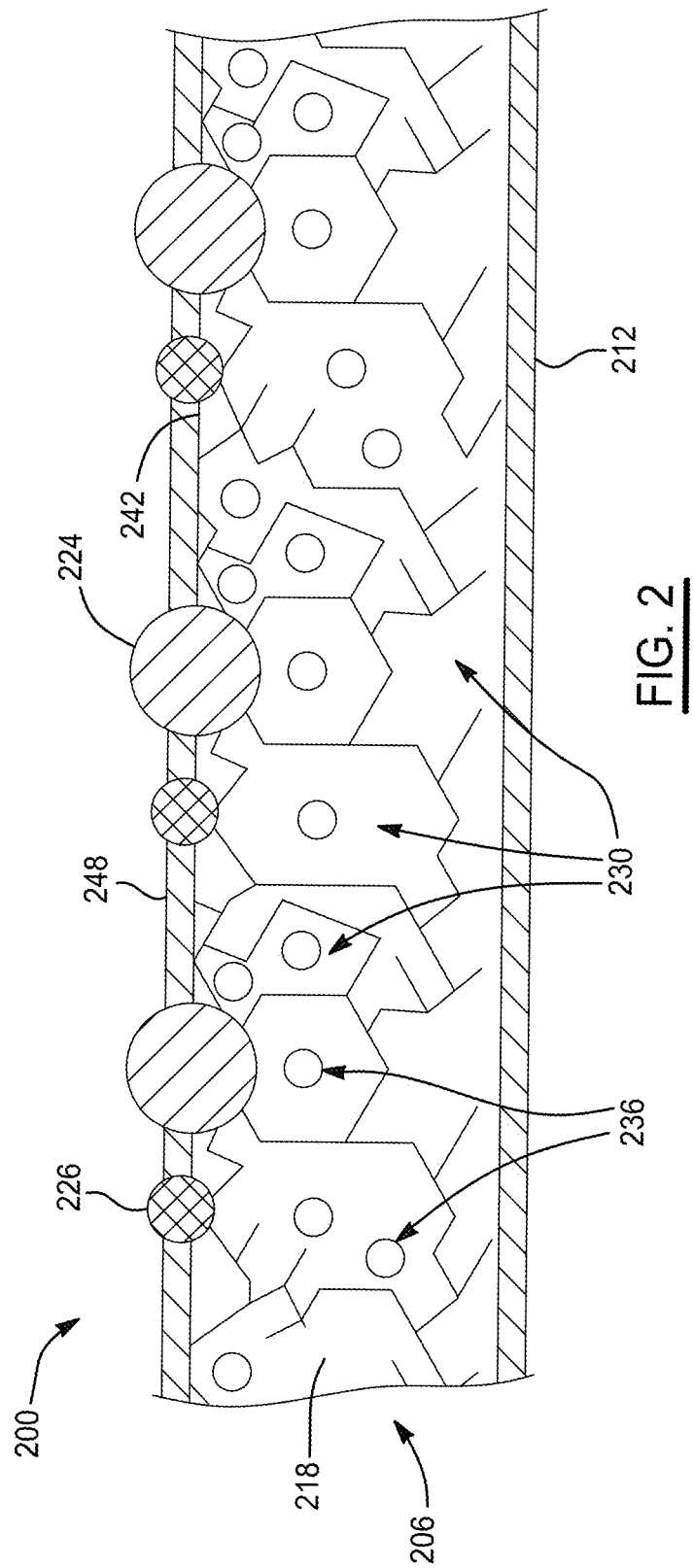

(51) Int. Cl.
*B01J 21/06* (2006.01)
*B01J 37/34* (2006.01)

(58) Field of Classification Search
USPC .......................................................... 428/446
See application file for complete search history.

(56) References Cited

U.S. PATENT DOCUMENTS

| | | | |
|---|---|---|---|
| 10,052,622 | B2 | 8/2018 | Dadheech et al. |
| 10,195,602 | B2 | 2/2019 | Dadheech et al. |
| 10,274,647 | B2 | 4/2019 | Seder et al. |
| 2013/0309591 | A1* | 11/2013 | Huang ................ C04B 38/0045 429/452 |
| 2015/0376441 | A1 | 12/2015 | Guldin et al. |
| 2017/0232430 | A1* | 8/2017 | Dadheech ................ B01J 35/06 502/4 |
| 2018/0318820 | A1 | 11/2018 | Dadheech et al. |
| 2018/0333709 | A1 | 11/2018 | Seder et al. |
| 2018/0333710 | A1 | 11/2018 | Dadheech et al. |
| 2018/0333711 | A1 | 11/2018 | Dadheech et al. |
| 2018/0333756 | A1 | 11/2018 | Seder et al. |
| 2018/0334742 | A1 | 11/2018 | Dadheech et al. |
| 2018/0348509 | A1 | 12/2018 | Carpenter et al. |

FOREIGN PATENT DOCUMENTS

| | | |
|---|---|---|
| CN | 101734865 A | 6/2010 |
| CN | 104703934 A | 6/2015 |
| CN | 107083184 A | 8/2017 |
| CN | 108126681 A | 6/2018 |
| CN | 111921548 A | 11/2020 |
| JP | 11333304 A * | 12/1999 |

OTHER PUBLICATIONS

Baur, The Prediction of Bond Length Variations in Silicon-Oxygen Bonds, 1971, American Mineralogist, vol. 56, pp. 1573-1599 (Year: 1971).*

Azar et al., Effect of Nd3+, Pectin and Poly(ethylene glycol) on the Photocatalytic Activity of TiO2/SiO2 Film, 2010, Asian Journal of Chemistry, vol. 22, pp. 1619-1627 (Year: 2010).*

Machine translation of JP 11333304 A originally published Dec. 1999 to Sugihara et al. (Year: 1999).*

He et al., Fluorine and boron co-doped diamond-like carbon films deposited by pulsed glow discharge plasma immersion ion processing, 2002, Journal of Vacuum Science & Technology, vol. 20, p. 638-642 (Year: 2002).*

Kosuge et al., Titanium-Containing Porous Silica Prepared by a Modified Sol-Gel Method, 1999, J. Phys. Chem. B, vol. 103, pp. 3563-3569 (Year: 1999).*

Nishimoto et al., Self-cleaning efficiency of titanium dioxide surface under simultaneous UV irradiation of various intensities and water flow, 2014, Journal of the Ceramic Society of Japan, 122 [6], 513-516 (Year: 2014).*

Xiao-Ming He et al.; "Fluorine and Boron Co-Doped Diamond-Like Carbon Films Deposited by Pulsed Glow Discharge Plasma Immersion Ion Processing"; Journal of Vacuum Science & Technology A 20, 638; (2002); 7 pages.

First Office Action for Chinese Patent Application No. 202010403025.1 dated Sep. 13, 2022, with correspondence from China Patent Agent (H.K.) Ltd. summarizing Office Action.

Second Office Action for Chinese Patent Application No. 202010403025.1 dated Apr. 1, 2023, with correspondence from China Patent Agent (H.K.) Ltd. summarizing Office Action; 16 pages.

* cited by examiner

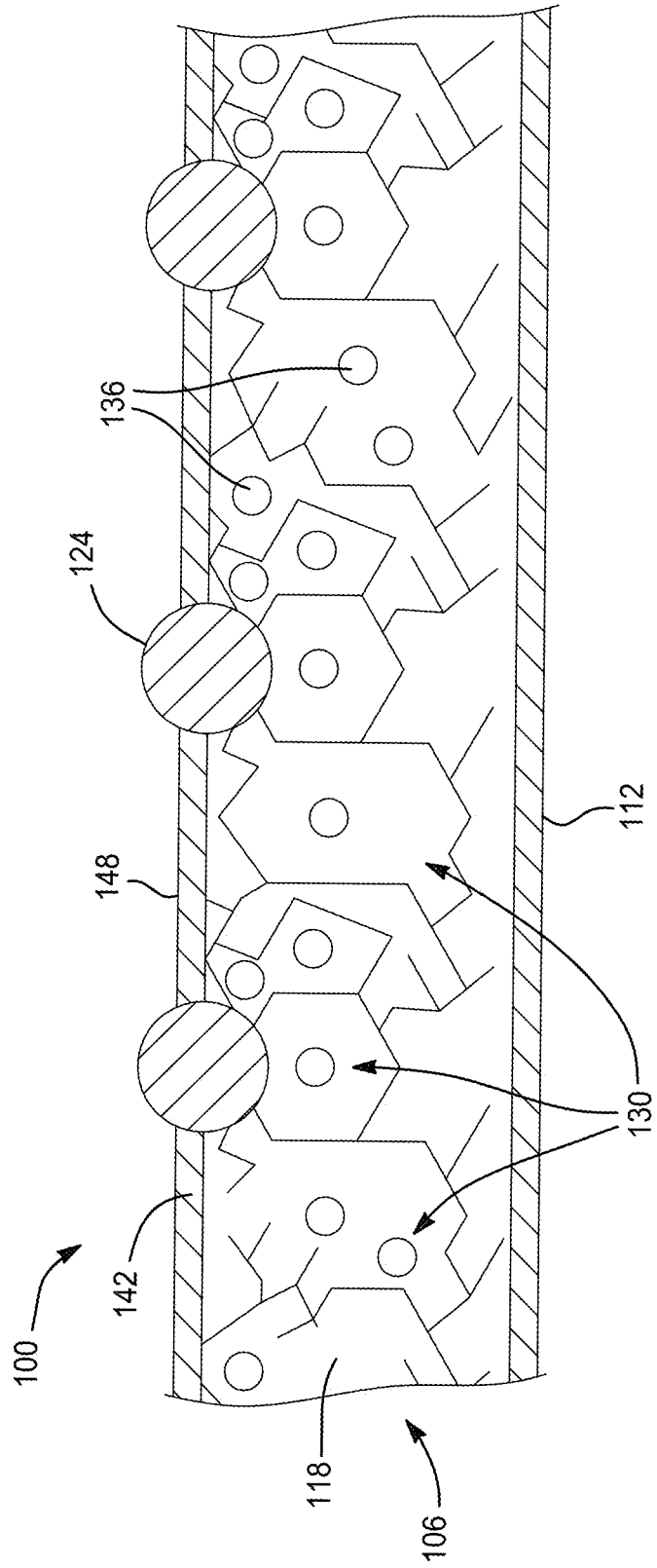
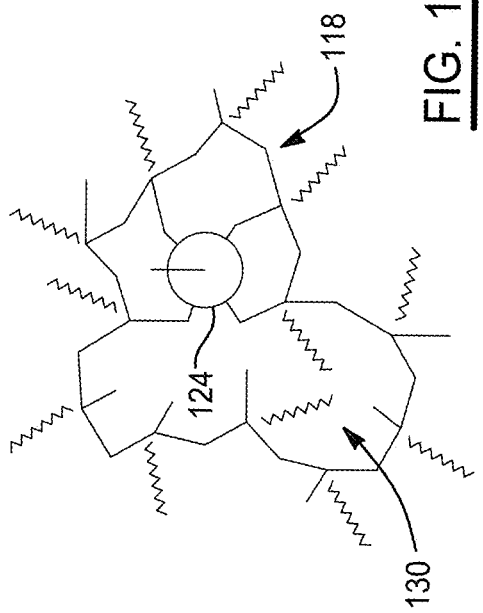

MULTIFUNCTIONAL SELF-CLEANING SURFACE LAYER AND METHODS OF FORMING THE SAME

This section provides background information related to the present disclosure which is not necessarily prior art.

The present disclosure relates to a multifunctional self-cleaning surface layer and methods of forming the same. The multifunctional self-cleaning surface layer includes an inorganic matrix; a plurality of photocatalytic active particles distributed within and bonded to the inorganic matrix; and a plurality of nanopores defined within the inorganic matrix in regions corresponding to the bonds between the plurality of photocatalytic active particles and the inorganic matrix.

Various surfaces may come into contact with skin, including touch screens, glasses, windows, camera lenses, appliances, mirrors, and the like. When such surfaces are touched or contacted, oils and/or other organic residues (e.g., fingerprint oils and residues) may remain on the surface. The oils and/or residues may be highly visible and may interfere with the optimal function of the device (i.e., the touch screens, glasses, windows, camera lenses, appliances, mirrors, and the like). Accordingly, it would be desirable to develop surface materials and methods that counteract the effects of the oils and/or residues, for example, by being self-cleaning.

SUMMARY

This section provides a general summary of the disclosure, and is not a comprehensive disclosure of its full scope or all of its features.

In various aspects, the present disclosure provides a multifunctional self-cleaning surface layer. The multifunctional self-cleaning surface layer may include an inorganic matrix including silicon and oxygen; a plurality of photocatalytic active particles distributed within and bonded to the inorganic matrix; and a plurality of nanopores defined within the inorganic matrix in regions corresponding to bonds between the plurality of photocatalytic active particles and the inorganic matrix. Water molecules may be disposed within at least a portion of the plurality of nanopores. In the presence of water and electromagnetic radiation, the plurality of photocatalytic active particles may facilitate a decomposition reaction of any oil or organic residue on the multifunctional self-cleaning surface layer.

In one aspect, an average pore diameter of the plurality of nanopores may be six to eight times a silicon-oxygen bond length in the inorganic matrix.

In one aspect, an average pore diameter of the plurality of nanopores may be greater than or equal to about 0.75 nm to less than or equal to about 1.5 nm.

In one aspect, the inorganic matrix may be a silicon oxide matrix ($SiO_x$).

In one aspect, the photocatalytic active particles may include one or more of titanium dioxide ($TiO_2$), zinc oxide (ZnO), zirconium dioxide ($ZrO_2$), tantalum oxide ($TaO_2$), strontium titanate ($SrTiO_2$), and tin dioxide ($SnO_2$), and a dopant including neodymium (Nd).

In one aspect, the plurality of photocatalytic active particles may include a first photocatalytic active material and a second photocatalytic active material. The first photocatalytic active material may include titanium dioxide ($TiO_2$), and the second photocatalytic active material may include a boron-doped fluorinated diamond-like carbon.

In one aspect, the plurality of photocatalytic particles may include greater than or equal to about 10 vol. % to less than or equal to about 50 vol. % of the first photocatalytic active material and greater than or equal to about 50 vol. % to less than or equal to about 90 vol. % of the second photocatalytic active material.

In one aspect, the multifunctional self-cleaning surface layer may define an exposed surface that includes the plurality of photocatalytic active particles and the exposed surface may further define select regions including a low surface energy material adjacent to the plurality of photocatalytic active particles.

In one aspect, the low surface energy material may include a perfluorocarbon siloxane polymer.

In one aspect, the inorganic matrix may have a thickness greater than or equal to about 10 nm to less than or equal to about 60 nm and the select regions including the low surface energy material have a thickness of greater than or equal to about 5 nm to less than or equal to about 500 nm.

In one aspect, the multifunctional self-cleaning surface layer may define an exposed surface and may further include a plurality of silver (Ag) particles distributed within the inorganic matrix along the exposed surface.

In one aspect, the multifunctional self-cleaning surface layer may be an anti-reflective coating having a refractive index (n) of less than 1.3.

In various other aspects, the present disclosure provides a method for preparing a multifunctional self-cleaning surface layer. The method includes admixing one or more activated photocatalytic active particles with one or more alkoxysilane precursors as a liquid or semi-liquid mixture so that the activated photocatalytic particles may react with the alkoxysilane precursors to form an inorganic matrix including silicon and oxygen bonded to the photocatalytic active particles. The method may further include removing liquid from the liquid or semi-liquid mixture by exposing the liquid or semi-liquid to a temperature greater than or equal to about 60° C. to less than or equal to about 150° C. for a time greater than or equal to about 1 hour to less than or equal to about 24 hours to form the multifunctional self-cleaning surface layer. The multifunctional self-cleaning surface layer may include a plurality of nanopores defined within the inorganic matrix in regions corresponding to bonds between the plurality of photocatalytic active particles and the inorganic matrix.

In one aspect, the alkoxysilane precursor may be selected from the group consisting of: tetramethyl orthosilicate ($Si(OCH_3)_4$) (TMOS), tetraethyl orthosilicate ($Si(OCH_2CH_3)_4$), N-octadecane trimethyl silicate $Si(OCH_3)_3((CH_2)_{17}CH_3)$, hexamethyl disiloxane (HMDSO), and combinations thereof.

In one aspect, the method may further include hydrolyzing one or more photocatalytic active particle precursors to form the activated photocatalytic active particles. Hydrolysis of one or more photocatalytic active material precursors may include mixing the one or more photocatalytic active particle precursors with tetrahydrofuran (THF).

In one aspect, the one or more photocatalytic active particle precursors may include a first photocatalytic active material precursor and a second photocatalytic active material precursor. The hydrolyzing may further include a first hydrolysis process of the first photocatalytic active material precursor to form a first activated photocatalytic active particle and a second hydrolysis process of the second photocatalytic active material precursor to form a second activated photocatalytic active particle. The admixing may include admixing the first activated photocatalytic active particle and the second activated photocatalytic active particle with the one or more alkoxysilane precursors to form the inorganic matrix including silicon and oxygen bonded to both a first photocatalytic active particle and a second photocatalytic active particle. The first photocatalytic active material may include titanium dioxide ($TiO_2$), and the second photocatalytic active material may include a boron-doped fluorinated diamond-like carbon.

In one aspect, the method may further include spin coating the liquid or semi-liquid onto one or more surfaces of a substrate followed by the drying.

In one aspect, the method may further include disposing a low surface energy material onto an exposed surface of the multifunctional self-cleaning surface layer and treating the low surface energy material coating with active radiation to remove the low surface energy material from the surfaces of the one or more photocatalytic active material particles so as to create select regions including the low surface energy material adjacent to the plurality of photocatalytic active particles on the exposed surface.

In one aspect, the inorganic matrix may have a thickness of greater than or equal to about 10 nm to less than or equal to about 60 nm and the select regions including the low surface energy material may have a thickness of greater than or equal to about 5 nm to less than or equal to about 500 nm. The low surface energy material may be a perfluorocarbon siloxane polymer.

In one aspect, the one or more activated photocatalytic active particles may include one or more of titanium dioxide ($TiO_2$), zinc oxide (ZnO), zirconium dioxide ($ZrO_2$), tantalum oxide ($TaO_2$), strontium titanate ($SrTiO_2$), and tin dioxide ($SnO_2$), and a dopant including neodymium (Nd).

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 3:
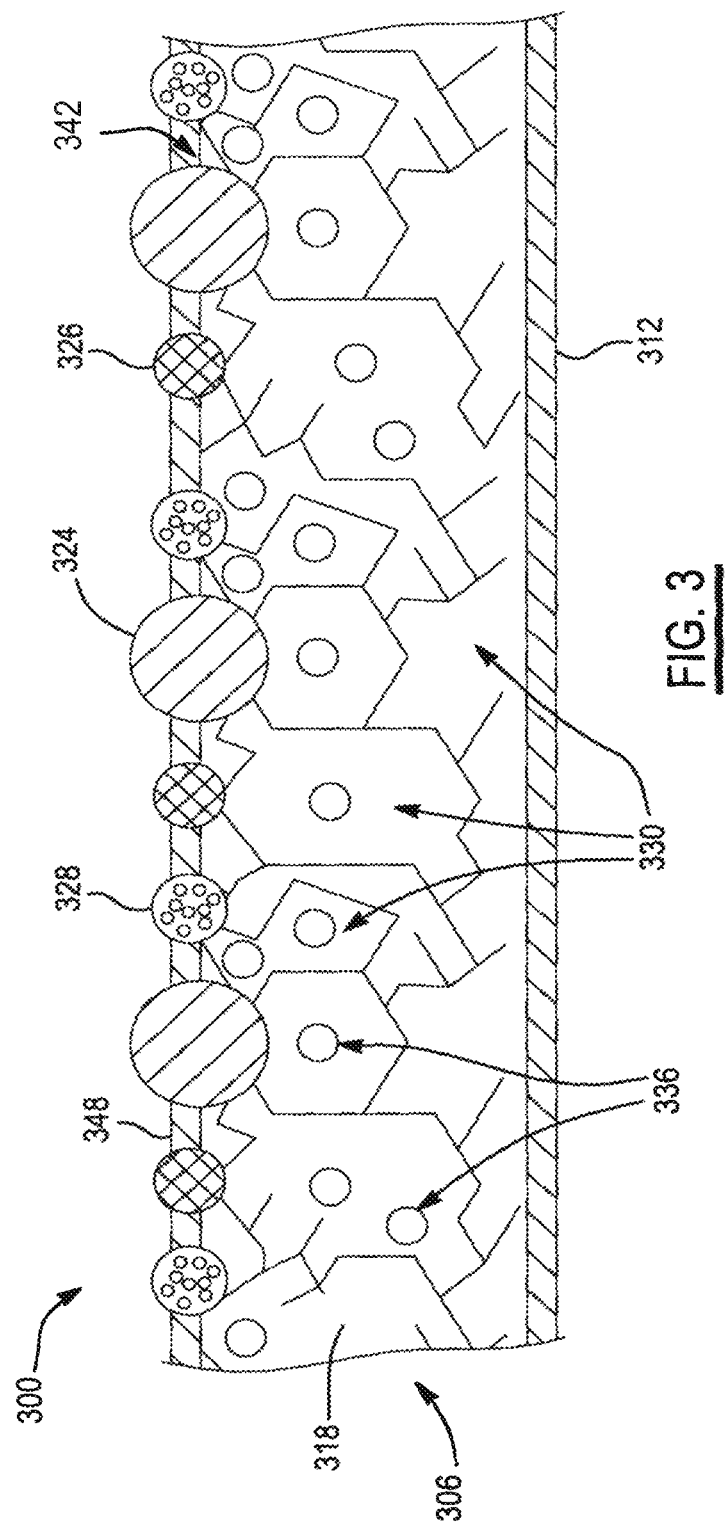

FIG. 1A shows a sectional side view of a multifunctional self-cleaning surface layer prepared in accordance with certain aspects of the present disclosure disposed on a substrate;

FIG. 1B is an exploded top down view of the of the multifunctional self-cleaning layer of FIG. 1A illustrating the inorganic matrix and the photocatalytic active particles distributed within and bonded to the inorganic matrix FIG. 2 shows a sectional side view of another multifunctional self-cleaning surface layer prepared in accordance with certain aspects of the present disclosure disposed on a substrate; and FIG. 3 shows a sectional side view of yet another multifunctional self-cleaning surface layer prepared in accordance with certain aspects of the present disclosure disposed on a substrate.

Corresponding reference numerals indicate corresponding parts throughout the several views of the drawings.

DETAILED DESCRIPTION

Example embodiments are provided so that this disclosure will be thorough, and will fully convey the scope to those who are skilled in the art. Numerous specific details are set forth, such as examples of specific compositions, components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising" is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected, or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer, or section. Terms such as "first," "second," and other numerical terms when used herein do not imply a sequence or order unless clearly indicated by the context. Thus, a first step, element, component, region, layer, or section discussed below could be termed a second step, element, component, region, layer, or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The present disclosure provides a photoactive system that may be a self-cleaning system that includes a multifunctional self-cleaning surface layer. An exemplary and schematic illustration of a photoactive or self-cleaning system 100 in accordance with various aspects of the present disclosure is shown in FIG. 1A. In various aspects, the photoactive system 100 may include a multifunctional self-cleaning surface layer 106.

The self-cleaning surface layer 106 may be disposed on one or more surfaces of a substrate 112. The substrate 112 may be any screen, lens, or other surface that may be touched or contacted by a user and where fingerprints, oils, and/or other organic or carbon-based contaminants or pathogens may be deposited. The multifunctional self-cleaning surface layer 106 may be useful for removing fingerprints and other organic contaminants from such surfaces. For example, the multifunctional self-cleaning surface layer 106 may be useful for automotive applications such as, but not limited to, in-dash navigation systems including touchscreens or vehicle cameras including lenses. Alternatively, the multifunctional self-cleaning surface layer 106 may be useful for non-automotive applications such as, but not limited to, consumer electronics, cellular telephones, eyewear, personal protective equipment, appliances, furniture, kiosks, fingerprint scanners, medical devices, sensors, aircraft, and industrial vehicles.

In various aspects, the multifunctional self-cleaning surface layer 106 includes an inorganic matrix 118. In certain variations, the inorganic matrix 118 may comprise silicon and oxygen, for example, a silicon oxide matrix ($SiO_x$). The inorganic matrix 118 may be formed from a sol-gel process, as described further herein. A plurality of particles may be distributed within the inorganic matrix 118. In certain aspects, the plurality of particles may be homogeneously distributed within the inorganic matrix 118, while in other aspects, the particles may be concentrated in certain regions, for example, along an exposed surface. In various aspects, a plurality of photocatalytic active particles 124 are distributed within and bonded to the inorganic matrix 118.

In certain aspects, the plurality of photocatalytic active particles 124 may be activated, for example, to have a surface bearing one or more hydroxyl groups. The hydroxyl groups may bond with the surrounding inorganic matrix, for example, bonding with silicon in the inorganic matrix 118 to form oxygen-silicon bonds. The oxygen-silicon bonds with the surrounding inorganic matrix 118 form cage-like structures that define a plurality of nanopores 130 within the inorganic matrix 118, as best illustrated in FIG. 1B. Notably, the nanopores 130 are formed near the plurality of photocatalytic active particles 124 bonds with the inorganic matrix 118, defining void regions proximate to the plurality of photocatalytic active particles 124. In certain variations, an average pore diameter of the plurality of nanopores 130 may be from six to eight times a silicon-oxygen bond length in the inorganic matrix 118. In certain aspects, the average pore diameter of the plurality of nanopores 130 may be greater than or equal to about 0.75 nm to less than or equal to about 1.5 nm, and in certain aspects, optionally greater than or equal to about 0.8 nm to less than or equal to about 1.4 nm.

With renewed reference to FIG. 1A, in certain aspects, water molecules 136 may be disposed within at least a portion of the plurality of nanopores 130. Water molecules 136 are thus present in the nanopores 130 adjacent to or near each photocatalytic active particle 124. In the presence of the water molecules 136 and electromagnetic radiation, the plurality of photocatalytic active particles 124 are capable of facilitating a decomposition reaction of oils and/or organic residues present on a surface of the multifunctional self-cleaning surface layer 106. More particularly, in the presence of water and electromagnetic radiation, the photocatalytic active particles 124 may oxidize and/or vaporize any organic material (e.g., squalene) present on a first surface 142 of the multifunctional self-cleaning surface layer 106. The first surface 142 of the multifunctional self-cleaning surface layer 106 may be parallel with the substrate 112.

Advantageously, the plurality of nanopores 130 formed near the plurality of photocatalytic active particles 124 are capable of receiving and storing water molecules 136 to enhance reactivity of the photocatalytic active particles 124, as compared to relying merely on diffusion of water from humidity in the atmosphere, for example. The water molecules 136 may be imbibed into the nanopores 130 within the inorganic matrix 118 from the surrounding atmosphere;

however, remain present in close proximity to the plurality of photocatalytic active particles 124 and thus ready for any reaction near the photocatalyst.

In various aspects, the photocatalytic active particles 124 may be a photocatalyst that is activated upon exposure to certain wavelengths of electromagnetic radiation, for example, visible light (having wavelengths ranging from about 390 nm to about 750 nm) or ultraviolet light (having wavelengths from about 10 nm to about 390 nm). For example, where the photocatalytic active particles 124 are exposed to an ultraviolet light having a wavelength below about 357 nm in the presence of water (e.g., ambient humidity), the photocatalytic active material 124 may be activated so as to facilitate a photocatalytic reaction. More specifically, the photocatalytic reaction may create an oxidation agent that breaks down the organic matter (e.g., squalene or other organic materials) to low chain hydrocarbons, carbon dioxide, and/or water. As such, the photocatalytic active particles 124 accelerate the rate of the photocatalytic decomposition reaction.

By way of further detail, when electromagnetic radiation having a desired wavelength illuminates the photocatalytic active particles 124 in the multifunctional self-cleaning surface layer 106, an electron from the valence band of the photocatalytic active particles 124 may be promoted to the conduction band of the photocatalytic active particles 124, which in turn may create a hole in the valence band and an excess of negative charge or electron in the conduction band. More specifically, the hole may promote oxidation and the electron may promote reduction. Generally, the hole may combine with water to produce a hydroxyl radical (·OH). The hole may also react directly with squalene or other organic material to increase an overall self-cleaning efficiency of the multifunctional self-cleaning surface layer 106. Similarly, oxygen in the ambient environment surrounding the photocatalytic active material may be reduced by the electron to form a superoxide ion ($·O_2^-$), which in turn may oxidize the organic material (e.g., fingerprint oils and other residues) present on the first surface 142.

In certain aspects, reaction byproducts may volatilize or otherwise be removed from the multifunctional self-cleaning surface layer 106. In addition, the hole may become trapped before recombination with the electron. For such situations, the photocatalytic active particles 124 may be doped with a dopant. The dopants may act as an electrocatalyst and may increase a transfer of electrons to oxygen molecules, which may in turn lower the occurrence of the recombination of electrons and holes. It should be noted that the dopants may also alter the wavelengths of activation energy, for example, by shifting the activation wavelength for the electrocatalyst particle from the ultraviolet range into the visible range.

Suitable photocatalytic active particles 124 may include, but are not limited to, photo-oxidative semiconductors, semiconducting oxides, doped metal oxides, heterojunction materials, and combinations thereof. For example, the photocatalytic active particle may comprise one or more of titanium dioxide ($TiO_2$), zinc oxide (ZnO), zirconium dioxide ($ZrO_2$), tantalum oxide ($TaO_2$), strontium titanate ($SrTiO_2$), and tin dioxide ($SnO_2$). By way of example, the photocatalytic active particles 124 may be doped with an element (e.g., metal) such as, but not limited to, neodymium (Nd), palladium (Pd), ruthenium (Ru), chromium (Cr), cobalt (Co), copper (Cu), vanadium (V), iron (Fe), platinum (Pt), molybdenum (Mo), lanthanum (La), niobium (Nb), and combinations thereof. Alternatively, the photocatalytic material particles 124 may be doped with a non-metal such as, but not limited to, nitrogen (N), sulfur (S), carbon (C), boron (B), potassium (K), iodine (I), fluorine (F), and combinations thereof. In still further variations, the photocatalytic active particles 124—for example, titanium dioxide ($TiO_2$)—may be doped with a lanthanide such as neodymium (Nd).

Therefore, the multifunctional self-cleaning surface layer 106 including the photocatalytic active particles 124 may be characterized as self-cleaning, so that the substrate 112 is protected from residue by removing, e.g., oxidizing and/or vaporizing the fingerprints, squalene, oils, and/or organic material deposited by touch of an operator. Consequently, the multifunctional self-cleaning surface layer 106 may enhance aesthetics, cleanliness, and readability of reflective or transparent surfaces for display systems, lenses, sensors, and the like. In certain variations, the multifunctional self-cleaning surface layer may be an anti-reflective coating having a real part of the refractive index (n) of less than 1.5, and in certain aspects, optionally less than 1.3.

In various aspects, the inorganic matrix 118 may be a silicon oxide matrix ($SiO_x$) and as noted above, the photocatalytic active particles 124 may be doped to form a photocatalytic material, for example, a doped titanium dioxide ($TiO_2$). In certain variations, the photocatalytic active particles 124 include a neodymium-doped titanium dioxide ($TiO_2$) particle.

In various aspects, the first surface 142 comprises the plurality of photocatalytic active particles 124 and may further define select regions comprising a low surface energy material 148. The select regions comprising the low surface energy material 148 may be adjacent to the photocatalytic active particles 124. In this manner, the first surface 142 may define a first plurality of select regions, which may be considered distinct areas, islands, or patches having a first surface energy and a second plurality of select regions or distinct areas, islands, or patches having a second surface energy. For example, the low surface energy material 148 may have a first surface energy at 20° C. that is greater than or equal to about 15 mN/m to less than or equal to about 45 mN/m, and in certain instances, optionally greater than or equal to about 20 mN/m to less than to about 30 mN/m; and the photocatalytic active particles 124 may have a second surface energy at 20° C. that is greater than or equal to about 70 mN/m to less than or equal to about 200 mN/m, and in certain instances, optionally greater than or equal to about 90 mN/m to less than to about 110 mN/m. Such a surface energy differential may induce fingerprint oils and other organic residues to migrate from the first or low surface energy area to the second or high surface energy patches, where the oils and/or residues may be decomposed by the photocatalytic active particles 124 as detailed above.

In certain instances, the first and second regions may be equally spaced apart from each other or arranged in a predetermined patterned along the first surface 142. In other instances, the first and second regions may be randomly or non-uniformly spaced along the first surface 142. In certain aspects, the low surface energy material 148 may comprise fluoropolymer. By way of non-limiting example, the fluoropolymer may be a perfluorocarbon siloxane polymer. For example, the perfluorocarbon siloxane polymer may be a polytetrafluoroethylene (PTFE) siloxane polymer. The thickness of the select regions comprising the low surface energy material 148 may be greater than or equal to about 5 nm to less than or equal to about 500 nm, and in certain aspects, optionally greater than or equal to about 5 nm to less than or equal to about 20 nm, while the thickness of the inorganic matrix may be greater than or equal to about 10 nm to less than or equal to about 60 nm, and in certain instances, optionally greater than or equal to about 25 nm to less than or equal to about 50 nm. In certain variations, the plurality of photocatalytic active particles 124 disposed along the first surface 142 of the inorganic matrix 118 may be dense so that only minor regions of silicon oxide is exposed. In such instances, the first surface 142 may be substantially free of the low surface energy material 148.

An exemplary illustration of another example photoactive or self-cleaning system 200 in accordance with various aspects of the present disclosure is shown in FIG. 2. In various aspects, the photoactive system 200 may include a multifunctional self-cleaning surface layer 206. Similar to the photoactive system 100 illustrated in FIG. 1A, the multifunctional self-cleaning surface layer 206 may be disposed on one or more surfaces of a substrate 212. The multifunctional self-cleaning surface layer 206 includes an inorganic matrix 218 comprising silicon and oxygen and pluralities of first and second photocatalytic active particles 224, 226 that are distributed within and bonded to the inorganic matrix 218. The bonds between the first and/or second photocatalytic active particles 224, 226 and the inorganic matrix 218 may define a plurality of nanopores 230 within the inorganic matrix 218. Water molecules 236 may be disposed within at least a portion of the plurality of nanopores 230 and, in the presence of the water molecules 236 and electromagnetic radiation, the first and second photocatalytic active particles 224, 226 may facilitate a decomposition reaction of oils or organic residues disposed on a first surface 242 of the multifunction self-cleaning surface layer 206.

In various aspects, the first plurality of photocatalytic active particles 224 may comprise one or more of titanium dioxide ($TiO_2$), zinc oxide (ZnO), zirconium dioxide ($ZrO_2$), tantalum oxide ($TaO_2$), strontium titanate ($SrTiO_2$), and tin dioxide ($SnO_2$). In certain variations, the second plurality of photocatalytic active particles 226 may comprise a fluorinated diamond-like carbon (F-DLC), and in certain variations, a boron-doped fluorinated diamond-like carbon. The multifunctional self-cleaning surface layer 206 may include greater than or equal to about 10 vol. % to less than or equal to about 50 vol. % of the first photocatalytic active material and greater than or equal to about 50 vol. % to less than or equal to about 90 vol. % of the second photocatalytic active material. The first surface 242 of the multifunctional self-cleaning surface layer 206 may comprise the first and second pluralities of photocatalytic active particles 224, 226, as well as select regions comprising a low surface energy material 248 adjacent to and/or between the pluralities of first and second photocatalytic active particles 224, 226.

An exemplary and schematic illustration of another example photoactive or self-cleaning system 300 in accordance with various aspects of the present disclosure is shown in FIG. 3. In various aspects, the photoactive system 300 may include a multifunctional self-cleaning surface layer 306. Similar to the photoactive system 100 illustrated in FIG. 1A and the photoactive system 200 illustrated in FIG. 2, the multifunctional self-cleaning surface layer 306 may be disposed on one or more surfaces of a substrate 312. The self-cleaning surface layer 306 includes an inorganic matrix 318 comprising silicon and oxygen and pluralities of first and second photocatalytic active particles 324, 326 that are distributed within and bonded to the inorganic matrix 318.

The multifunctional self-cleaning surface layer 306 optionally further includes one or more anti-microbial agents. For example, the multifunctional self-cleaning surface layer 306 may include an antimicrobial particle, such as one comprising silver (Ag). The silver may be characterized as a nanoparticle and may have an average diameter measureable on a nanometer scale. Alternatively, the silver may be characterized as a particle 328 and may have an average diameter measureable on a micrometer scale. In certain variations, silver may be present in the multifunctional self-cleaning surface layer 306 in an amount of from about 1 parts by volume to about 35 parts by volume based on 100 parts by volume of the surface layer 306, and in certain aspects, optionally from about 2 parts by volume to about 35 parts by volume based on 100 parts by volume of the surface layer 306. The silver particles 328 may provide the multifunctional self-cleaning surface layer 306 with soil-resistance, anti-microbial, and air-purifying properties. For example, the silver may disrupt microbe cellular function. In particular, the silver may contribute to phospholipid decomposition such that a microbe cell well cannot undergo respiration.

In various aspects, the bonds between the first and/or second photocatalytic active particles 324, 326 and the inorganic matrix 318 may define a plurality of nanopores 330 within the inorganic matrix 318. Water molecules 336 may be disposed within at least a portion of the plurality of nanopores 330 and, in the presence of the water molecules 336 and electromagnetic radiation, the first and second photocatalytic active particles 324, 326 may facilitate a decomposition reaction of oils or organic residues disposed on a first surface 342 of the multifunctional self-cleaning surface layer 306. The first plurality of photocatalytic active particles 324 may comprise one or more of titanium dioxide ($TiO_2$), zinc oxide (ZnO), zirconium dioxide ($ZrO_2$), tantalum oxide ($TaO_2$), strontium titanate ($SrTiO_2$), and tin dioxide ($SnO_2$). The second plurality of photocatalytic active particles 326 may comprise a boron-doped fluorinated diamond-like carbon. The first surface 342 of the multifunctional self-cleaning surface layer 306 may comprise the first and second pluralities of photocatalytic active particles 324, 326, as well as the silver particles 328 and select regions comprising a low surface energy material 348 adjacent to and/or between the pluralities of first and second photocatalytic active particles 324, 326 and the silver particles 328.

In various aspects, a method of forming a photoactive system (e.g., 100, 200, 300) includes admixing one or more activated photocatalytic active particles with one or more alkoxysilane precursors as a liquid or semi-liquid mixture. A semi-liquid may encompass a colloid or gel, for example, during a sol-gel process. By activated, it is meant that a surface of the photocatalytic active particles is treated to form reactive groups, such as hydroxyl groups. In certain aspects, the photocatalytic active particle precursors can be treated with an activation agent to create a surface bearing various reactive groups, such as hydroxyl groups.

In various aspects, the activated photocatalytic active particles may be formed by hydrolyzing one or more photocatalytic active particle precursors. Hydrolysis of the one or more photocatalytic active material precursors may include admixing the one or more photocatalytic active particle precursors with an activation agent, such as tetrahydrofuran (THF) and/or other aprotic solvents. In certain aspects, the one or more photocatalytic active particle precursors may include a first photocatalytic active material precursor (e.g., titanium dioxide ($TiO_2$)) and a second photocatalytic active material precursor (e.g., boron-doped fluorinated diamond-like carbon). In such instances, hydrolyzing may include a first hydrolysis process of the first photocatalytic active material precursor to form a first activated photocatalytic active particle and a second hydrolysis process of the second photocatalytic active material precursor to form a second activated photocatalytic active particle.

The activated photocatalytic particles can react with the alkoxysilane precursors to form an inorganic matrix comprising silicon and oxygen bonded to the photocatalytic active particle. More specifically, the alkoxysilane precursor may be selected from the group consisting of: tetramethyl orthosilicate ($Si(OCH_3)_4$) (TMOS), tetraethyl orthosilicate ($Si(OCH_2CH_3)_4$), N-octadecane trimethyl silicate $Si(OCH_3)_3((CH_2)_{17}CH_3)$, hexamethyl disiloxane (HMDSO), and combinations thereof. Each activated photocatalytic particle includes at least one hydroxyl group that is capable of forming a bond with silicon forming the surrounding inorganic matrix. In certain aspects, the activated photocatalytic particle has at least two hydroxyl groups, at least three hydroxyl groups, at least four hydroxyl groups, and optionally at least five hydroxyl groups. The hydroxyl groups are capable of forming a bond with the silicon in the surrounding inorganic matrix.

Where two activated photocatalytic particles are prepared, the method may include mixing the first activated photocatalytic active particle and the second activated photocatalytic active particle with the one or more alkoxysilane precursors to form the inorganic matrix comprising silicon and oxygen bonded to both a first photocatalytic active particle and a second photocatalytic active particle.

After the admixing of the activated photocatalytic active particles with the alkoxysilane precursors to form the inorganic matrix, the liquid or semi-liquid mixture (e.g., gel) is dried to form the multifunctional self-cleaning surface layer. Thus, liquid is removed from the liquid or semi-liquid mixture. For example, in various aspects, the liquid or semi-liquid mixture may be exposed to a temperature (e.g., heat source) of greater than or equal to about 60° C. to less than or equal to about 150° C. for a time greater than or equal to about 1 hours to less than or equal to about 24 hours to form the dry multifunctional self-cleaning surface layer. Notably, the heating process can densify the inorganic matrix eventually resulting in consolidation and collapse of the nanopores, so the drying is done at conditions such that a substantial portion of the nanopores surrounding the particles remain intact. In various aspects, the liquid or semi-liquid (e.g., gel) mixture may be disposed onto one or more surfaces of a substrate prior to the drying. In certain instances, the liquid or semi-liquid mixture may be disposed using a spin coating process.

In various aspects, the method further includes disposing a low surface energy material onto an exposed surface of the multifunctional self-cleaning surface layer. The low surface energy material may be applied to the exposed surface of the multifunctional self-cleaning layer using any suitable manner. By way of non-limiting examples, applying the low surface energy material may occur by chemical vapor depositing ("CVD"), atomic layer deposition ("ALD"), dipping, wiping, spraying, meniscus coating, wet coating, combinations and equivalents thereof. The disposed low surface energy material may be treated with active radiation to remove the low surface energy material from surfaces of the one or more photocatalytic active material particles so as to create select regions comprising the low surface energy material adjacent to the plurality of photocatalytic active particles on the exposed surface.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multifunctional self-cleaning surface layer comprising:
    an inorganic matrix comprising silicon and oxygen, the inorganic matrix having an average thickness greater than or equal to about 10 nanometers to less than or equal to about 60 nanometers;
    a plurality of photocatalytic active particles distributed within and bonded to the inorganic matrix, wherein the multifunctional self-cleaning surface layer defines an exposed surface comprising the plurality of photocatalytic active particles;
    a plurality of nanopores defined within the inorganic matrix in regions corresponding to bonds between the plurality of photocatalytic active particles and the inorganic matrix;
    water disposed within at least a portion of the plurality of nanopores, wherein in the presence of water and electromagnetic radiation, the plurality of photocatalytic active particles facilitates a decomposition reaction of any oil or organic residue on the multifunctional self-cleaning surface layer; and
    wherein the exposed surface further defines select regions comprising a low surface energy material adjacent to the plurality of photocatalytic active particles, the select regions having an average thickness greater than or equal to about 5 nanometers to less than or equal to about 500 nanometers.

2. The multifunctional self-cleaning surface layer of claim 1, wherein an average pore diameter of the plurality of nanopores is six to eight times a silicon-oxygen bond length in the inorganic matrix.

3. The multifunctional self-cleaning surface layer of claim 1, wherein an average pore diameter of the plurality of nanopores is greater than or equal to about 0.75 nm to less than or equal to about 1.5 nm.

4. The multifunctional self-cleaning surface layer of claim 1, wherein the inorganic matrix is a silicon oxide matrix ($SiO_x$).

5. The multifunctional self-cleaning surface layer of claim 1, wherein the plurality of photocatalytic active particles comprise one or more of titanium dioxide ($TiO_2$), zinc oxide (ZnO), zirconium dioxide ($ZrO_2$), tantalum oxide ($TaO_2$), strontium titanate ($SrTiO_2$), and tin dioxide ($SnO_2$), and a dopant comprising neodymium (Nd).

6. The multifunctional self-cleaning surface layer of claim 1, wherein the plurality of photocatalytic active particles includes a first photocatalytic active material and a second photocatalytic active material, wherein the first photocatalytic active material comprises titanium dioxide ($TiO_2$) and the second photocatalytic active material comprises a boron-doped fluorinated diamond-like carbon.

7. The multifunctional self-cleaning surface layer of claim 6, wherein the plurality of photocatalytic particles includes greater than or equal to about 10 vol. % to less than or equal to about 50 vol. % of the first photocatalytic active material and greater than or equal to about 50 vol. % to less than or equal to about 90 vol. % of the second photocatalytic active material.

8. The multifunctional self-cleaning surface layer of claim 1, wherein the low surface energy material comprises a perfluorocarbon siloxane polymer.

9. The multifunctional self-cleaning surface layer of claim 1, wherein the multifunctional self-cleaning surface layer further comprises a plurality of silver (Ag) particles distributed within the inorganic matrix along the exposed surface.

10. The multifunctional self-cleaning surface layer of claim 1, wherein the multifunctional self-cleaning surface layer is an anti-reflective coating having a refractive index (n) of less than 1.3.

11. A method for preparing the multifunctional self-cleaning surface layer of claim 1 comprising:

admixing one or more activated photocatalytic active particles with one or more alkoxysilane precursors as a liquid or semi-liquid mixture so that the activated photocatalytic particles react with the alkoxysilane precursors to form an inorganic matrix comprising silicon and oxygen bonded to the photocatalytic active particles, the inorganic matrix having an average thickness greater than or equal to about 10 nanometers to less than or equal to about 60 nanometers;

removing liquid from the liquid or semi-liquid mixture by exposing the liquid or semi-liquid to a temperature greater than or equal to about 60° C. to less than or equal to about 150° C. for a time greater than or equal to about 1 hour to less than or equal to about 24 hours to form the multifunctional self-cleaning surface layer comprising a plurality of nanopores defined within the inorganic matrix in regions corresponding to bonds between the plurality of photocatalytic active particles and the inorganic matrix, wherein water is disposed within at least a portion of the plurality of nanopores; and disposing a low surface energy material onto an exposed surface of the multifunctional self-cleaning surface layer and treating the low surface energy material coating with active radiation to remove the low surface energy material from the surfaces of the one or more photocatalytic active material particles so as to create regions comprising the low surface energy material adjacent to the plurality of photocatalytic active particles on the exposed surface, the regions having an average thickness greater than or equal to about 5 nanometers to less than or equal to about 500 nanometers.

12. The method of claim 11, wherein the alkoxysilane precursor is selected from the group consisting of: tetramethyl orthosilicate ($Si(OCH_3)_4$) (TMOS), tetraethyl orthosilicate ($Si(OCH_2CH_3)_4$), N-octadecane trimethyl silicate $Si(OCH_3)_3((CH_2)_{17}CH_3)$, hexamethyl disiloxane (HMDSO), and combinations thereof.

13. The method of claim 11, wherein the method further includes hydrolyzing one or more photocatalytic active particle precursors to form the activated photocatalytic active particles, wherein hydrolysis of one or more photocatalytic active material precursors comprises mixing the one or more photocatalytic active particle precursors with tetrahydrofuran (THF).

14. The method of claim 13, wherein the one or more photocatalytic active particle precursors includes a first photocatalytic active material precursor and a second photocatalytic active material precursor, the hydrolyzing further comprises a first hydrolysis process of the first photocatalytic active material precursor to form a first activated photocatalytic active particle and a second hydrolysis process of the second photocatalytic active material precursor to form a second activated photocatalytic active particle, and admixing comprises admixing the first activated photocatalytic active particle and the second activated photocatalytic active particle with the one or more alkoxysilane precursors to form the inorganic matrix comprising silicon and oxygen bonded to both a first photocatalytic active particle and a second photocatalytic active particle, wherein the first photocatalytic active material comprises titanium dioxide ($TiO_2$) and the second photocatalytic active material comprises a boron-doped fluorinated diamond-like carbon.

15. The method of claim 11, wherein the method further comprises spin coating the liquid or semi-liquid onto one or more surfaces of a substrate followed by the drying.

16. The method of claim 11, wherein the low surface energy material is a perfluorocarbon siloxane polymer.

17. The method of claim 11, wherein the one or more activated photocatalytic active particles comprises one or more of titanium dioxide ($TiO_2$), zinc oxide (ZnO), zirconium dioxide ($ZrO_2$), tantalum oxide ($TaO_2$), strontium titanate ($SrTiO_2$), and tin dioxide ($SnO_2$) and a dopant comprising neodymium (Nd).

* * * * *